(12) United States Patent
Karczewicz et al.

(10) Patent No.: US 8,335,261 B2
(45) Date of Patent: Dec. 18, 2012

(54) VARIABLE LENGTH CODING TECHNIQUES FOR CODED BLOCK PATTERNS

(75) Inventors: Marta Karczewicz, San Diego, CA (US); Hyukjune Chung, San Diego, CA (US); Phoom Sagetong, Orange, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1379 days.

(21) Appl. No.: 11/958,675

(22) Filed: Dec. 18, 2007

(65) Prior Publication Data

US 2008/0165858 A1    Jul. 10, 2008

Related U.S. Application Data

(60) Provisional application No. 60/883,951, filed on Jan. 8, 2007.

(51) Int. Cl.
*H04N 7/12*  (2006.01)
*H04N 11/02* (2006.01)
*H04N 11/04* (2006.01)

(52) U.S. Cl. ................................. 375/240.23

(58) Field of Classification Search ............. 375/240.23
See application file for complete search history.

(56) References Cited

U.S. PATENT DOCUMENTS

| | | | |
|---|---|---|---|
| 6,571,019 B1 * | 5/2003 | Kim et al. ............ | 382/246 |
| 7,130,475 B2 | 10/2006 | Kim et al. | |
| 7,664,176 B2 * | 2/2010 | Bao et al. ............. | 375/240.08 |
| 2004/0066974 A1 * | 4/2004 | Karczewicz et al. ........ | 382/239 |
| 2004/0234144 A1 | 11/2004 | Sugimoto et al. | |
| 2005/0025246 A1 | 2/2005 | Holcomb | |
| 2005/0163211 A1 | 7/2005 | Shanableh | |
| 2006/0156204 A1 | 7/2006 | Lee et al. | |
| 2008/0137753 A1 * | 6/2008 | He .......................... | 375/240.24 |

FOREIGN PATENT DOCUMENTS

| | | |
|---|---|---|
| CN | 1545813 A | 11/2004 |
| EP | 1478190 A1 | 11/2004 |
| JP | 2003069295 A | 3/2003 |

(Continued)

OTHER PUBLICATIONS

Karczewicz, et al., Proposal Document "CBP Coding Enhancements for CGS Enhancement Layer," JVT-V092, Jan. 13-19, 2007, 22nd Meeting, Marrakech, Morocco.

(Continued)

*Primary Examiner* — Mark Rinehart
*Assistant Examiner* — Maharishi Khirodhar
(74) *Attorney, Agent, or Firm* — Brent A. Boyd

(57) ABSTRACT

Variable length coding (VLC) techniques are described for coded block patterns (CBPs) used in block-based video coding. In VLC of CBPs, patterns of transform coefficients that are more likely to occur are coded with shorter codes, while patterns of coefficients that are less likely to occur are coded with longer codes. According to the techniques of this disclosure, several different VLC tables are stored in the coding devices. During the encoding and decoding processes, one of the VLC tables is selected and used to perform the coding of CBPs for a given video block. The table may be selected based on a number of neighboring video blocks to the current video block that include non-zero transform coefficients. The techniques may be particularly useful in the coding of video blocks of enhancement layers in scalable video coding (SVC).

18 Claims, 7 Drawing Sheets

FOREIGN PATENT DOCUMENTS

| | | |
|---|---|---|
| JP | 2003324731 | 11/2003 |
| JP | 2006033148 A | 2/2006 |
| JP | 2006232765 A | 9/2006 |
| KR | 20010105629 | 11/2001 |
| RU | 2004125588 | 1/2006 |

OTHER PUBLICATIONS

"Forward Link Only Air Interface Specification for Terrestrial Mobile Multimedia Multicast," TIA-1099, Aug. 2006.

Wiegand, T. et al., "Joint Draft 6: Scalable Video Coding," JVT-S 201, Apr. 2006, Geneva.

Wiegand, T. et al., "Joint Draft 9 of SVC Amendment," JVT-V 201, Jan. 2007, Marrakech, Morocco.

ITU-T Recommendation H.264, Advanced Video Coding for Generic Audiovisual Services, Mar. 2005.

Bjontegaard, et al., "Simplified VLC coding of transform coefficients, VCEG-Y08, ITU," transform coefficients, VCEG-Y08, ITU—Telecommunications Standardization Sector Study Group 16 Question 6, Video Coding Experts Group (VCEG), Hong Kong, Jan. 16-18, 2005.

International Search Report and Written Opinion—PCT/US2008/050443, International Search Authority—European Patent Office—Jun. 29, 2009.

Karczewicz et al.: "SVC CBP coding for CGS enhancement layer" Joint Video Team (JVT) of ISO/IEC MPEG & ITU-T VCEG (ISO/IEC JTC1/SC29/WG11 and ITU-T SG16 Q6, No. JVT-V092, Jan. 10, 2007, XP030006900.

Ridge J: "An AVC-based scalable video coder" Joint Video Team (JVT) of ISO/IEC MPEG & ITU-T VCEG (ISO/IEC JTC1/SC29/WG11 and ITU-T SG16 Q6), No. VCEG-X07, Oct. 17, 2004, XP030003424.

Ridge J.,et al., "CE8: VLCs for SVC, Joint Video Team (JVT) of ISO/IEC MPEG & ITU-T VCEG," VT-Q040-L, 2005.

Yey et al.: "Improvements to FGS layer VLC" Joint Video Team (JVT) of ISO-IEC MPEG & ITU-T VCEG (ISO/IEC JTC1/SC29/WG11 and ITU-T SG16 Q6), No. JVT-S066, Mar. 28, 2006, pp. XP030006445.

Macnicol, James, "Scalable Video Coding by Stream Morphing," IEEE Transactions on Circuits and Systems for Video Technology, vol. 15, No. 2, Feb. 2005, pp. 306-319.

Taiwan Search Report—TW097100718-TIPO—Sep. 19, 2011.

\* cited by examiner

VARIABLE LENGTH CODING TECHNIQUES FOR CODED BLOCK PATTERNS

This application claims the benefit of U.S. Provisional Application No. 60/883,951, filed on Jan. 8, 2007, the entire content of which is incorporated herein by reference.

TECHNICAL FIELD

This disclosure relates to digital video coding and, more particularly, variable length coding (VLC) of coded block patterns (CBPs) used to code video information.

BACKGROUND

Digital video capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video signals.

In video coding, video compression generally includes spatial prediction, motion estimation and motion compensation. Intra-coding relies on spatial prediction to reduce or remove spatial redundancy between video blocks within a given video frame. Inter-coding relies on temporal prediction to reduce or remove temporal redundancy between video blocks of successive video frames of a video sequence. For inter-coding, a video encoder performs motion estimation to track the movement of matching video blocks between two or more adjacent frames. Motion estimation generates motion vectors, which indicate the displacement of video blocks relative to corresponding prediction video blocks in one or more reference frames. Motion compensation uses the motion vector to generate the prediction video block from a reference frame. After motion compensation, a residual video block is formed by subtracting the prediction video block from the original video block.

The video encoder usually applies transform, quantization and variable length coding (VLC) processes to further reduce the bit rate associated with communication of the residual block. VLC involves the application of arithmetic codes or variable length codes to further compress residual coefficients produced by the transform and quantization operations. One example of VLC is context-adaptive variable length coding (CAVLC). Once the information is coded, it can be sent to another device. At the receive device, a video decoder performs inverse operations to reconstruct the encoded video, using the motion information and residual information for each of the blocks.

Some video coding makes use of scalable techniques. For example, scalable video coding (SVC) refers to video coding in which a base layer and one or more scalable enhancement layers are used. For SVC, a base layer typically carries video data with a base level of quality. One or more enhancement layers carry additional video data to support higher spatial, temporal and/or SNR levels. The base layer may be transmitted in a manner that is more reliable than the transmission of enhancement layers. For example, the most reliable portions of a modulated signal may be used to transmit the base layer, while less reliable portions of the modulated signal may be used to transmit the enhancement layers.

SUMMARY

In general, this disclosure describes techniques for coding coded block patterns (CBPs) of video blocks. CBPs refer to patterns of coefficients within video blocks that are coded via information that maps to the patterns. In order to code different CBPs, variable length coding (VLC) techniques may be used in which patterns of coefficients that are more likely to occur are coded with shorter codes, while patterns of coefficients that are less likely to occur are coded with longer codes. The coded video block may include a flag or other information within its header to indicate that CBPs are being used.

According to the techniques of this disclosure, several different VLC tables are stored in the coding devices. During the encoding and decoding processes, one of the VLC tables is selected and used to perform the coding of CBPs for a given video block. The table may be selected in a manner that promotes coding efficiency. To do so, the techniques may exploit the phenomenon of spatial redundancy within a video frame. Specifically, the techniques of this disclosure may perform table selection for CBP VLC of a current video block based on a number of neighboring video blocks to the current video block that include non-zero transform coefficients. The techniques may be particularly useful in the coding of video blocks of enhancement layers in scalable video coding (SVC).

In one example, this disclosure provides a method comprising selecting a VLC table for a current video block from a plurality of tables based on a number of neighboring video blocks to the current video block that include non-zero transform coefficients, and coding one or more CBPs of the current video block using the selected VLC table.

In another example, this disclosure provides a device comprising a VLC unit configured to select a VLC table for a current video block from a plurality of tables based on a number of neighboring video blocks to the current video block that include non-zero transform coefficients, and coding one or more CBPs of the current video block using the selected VLC table.

In another example, this disclosure provides a device comprising means for selecting a VLC table for a current video block from a plurality of tables based on a number of neighboring video blocks to the current video block that include non-zero transform coefficients, and means for coding one or more CBPs of the current video block using the selected VLC table.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution in a video coding device cause the device to select a VLC table for a current video block from a plurality of tables based on a number of neighboring video blocks to the current video block that include non-zero transform coefficients, and code one or more CBPs of the current video block using the selected VLC table. In some cases, the computer readable medium may form part of a computer program product, which may be sold to manufacturers and/or used in a video coding device. The computer program product may include a computer readable medium, and in some cases, may also include packaging materials.

In other cases, this disclosure may be directed to a circuit, such as an integrated circuit, chipset, application specific integrated circuit (ASIC), field programmable gate array (FPGA), logic, or various combinations thereof configured to perform one or more of the techniques described herein.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
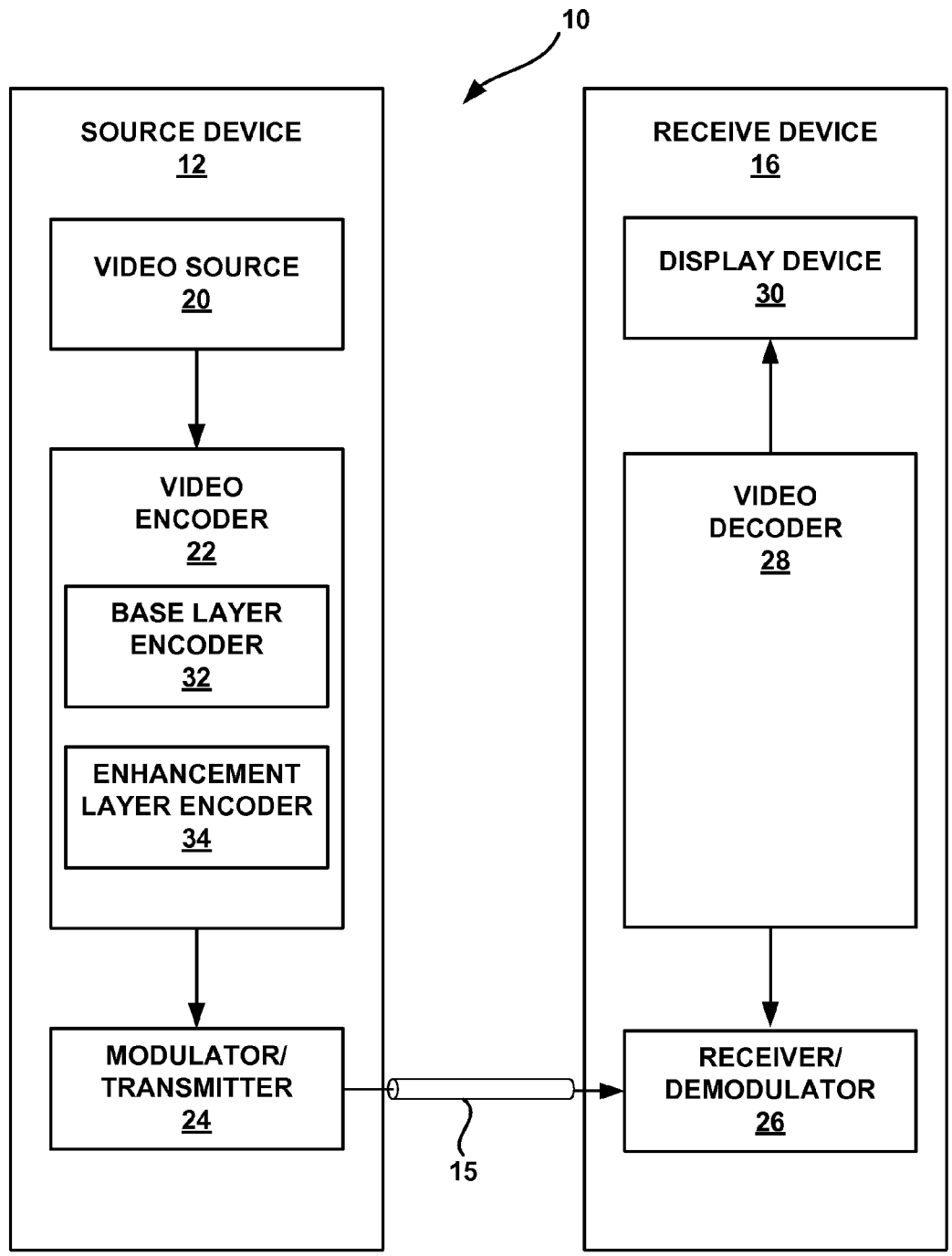
FIG. 1 is an exemplary block diagram illustrating a video encoding and decoding system.

FIG. 1 is a block diagram illustrating a video encoding and decoding system 10. As shown in FIG. 1, system 10 includes a source device 12 that transmits encoded video to a receive device 16 via a communication channel 15. Source device 12 may include a video source 20, video encoder 22 and a modulator/transmitter 24. Receive device 16 may include a receiver/demodulator 26, video decoder 28, and display device 30. System 10 may be configured to apply techniques for variable length coding (VLC) of coded block patterns (CBPs) of video information.

CBPs refer to patterns of coefficients within video blocks that are coded via information that maps to the patterns. In some formats, CBPs comprise four-bit sets of coefficients, and several CBPs are coded for each video block. However, longer or shorter CBPs could be defined. In order to code different CBPs, VLC techniques may be used in which patterns of coefficients that are more likely to occur are coded with shorter codes, and patterns of coefficients that are less likely to occur are coded with longer codes. The coded video block may include a flag or other information within its header to indicate that CBPs are being used in the coding scheme.

According to the techniques of this disclosure, several different VLC tables are stored in the respective video encoder 22 and video decoder 28 of coding devices 12, 16. During the encoding and decoding processes, one of the VLC tables is selected and used to perform the encoding or decoding of CBPs for a given video block. Encoding and decoding may be generally referred to herein as coding. The table may be selected in a manner that promotes coding efficiency. For example, video encoder 22 and video decoder 28 may exploit the phenomenon of spatial redundancy within a video frame. Specifically, video encoder 22 and video decoder 28 may perform table selection for CBP VLC of a current video block based on a number of neighboring video blocks to the current video block that include non-zero transform coefficients. These techniques may be particularly useful in the coding of video blocks of enhancement layers in scalable video coding (SVC).

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to receive device 16.

Source device 12 generates coded video data for transmission to receive device 16. In some cases, however, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video and computer-generated video. In some cases, if video source 20 is a video camera, source device 12 and receive device 16 may form so-called camera phones or video phones. In each case, the captured, pre-captured or computer-generated video may be encoded by video encoder 22 for transmission from video source device 12 to video decoder 28 of video receive device 16 via modulator/transmitter 22, communication channel 15 and receiver/demodulator 26. The video encoding and decoding processes may implement the VLC techniques for CBPs, as described herein, to improve the processes. Display device 30 displays the decoded video data to a user, and may comprise any of a variety of display devices such as a cathode ray tube, a liquid crystal display (LCD), a plasma display, an organic light emitting diode (OLED) display, or another type of display device.

Video encoder 22 and video decoder 28 may be configured to support scalable video coding (SVC) for spatial, temporal and/or signal-to-noise ratio (SNR) scalability. In some aspects, video encoder 22 and video decoder 28 may be configured to support fine granularity SNR scalability (FGS) coding for SVC. Encoder 22 and decoder 28 may support various degrees of scalability by supporting encoding, transmission and decoding of a base layer and one or more scalable enhancement layers. For scalable video coding, a base layer carries video data with a baseline level of quality. One or more enhancement layers carry additional data to support higher spatial, temporal and/or SNR levels. The base layer may be transmitted in a manner that is more reliable than the transmission of enhancement layers. For example, the most reliable portions of a modulated signal may be used to transmit the base layer, while less reliable portions of the modulated signal may be used to transmit the enhancement layers.

In order to support SVC, video encoder 22 may include a base layer encoder 32 and one or more enhancement layer encoders 34 to perform encoding of a base layer and one or more enhancement layers, respectively. The techniques of this disclosure, which involve table selection for CBP VLC of a current video block based on a number of neighboring video blocks to the current video block that include non-zero transform coefficients, may be particularly useful in the coding of video blocks of enhancement layers in SVC.

Video decoder 28 may comprise a combined base/enhancement decoder that decodes the video blocks associated with both base and enhancement layers, and combines the decoded video to reconstruct the frames of a video sequence. Display device 30 receives the decoded video sequence, and presents the video sequence to a user.

Video encoder 22 and video decoder 28 may operate according to a video compression standard, such as MPEG-2, MPEG-4, ITU-T H.263, or ITU-T H.264/MPEG-4, Part 10, Advanced Video Coding (AVC). Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced video coding for generic audiovisual services, by the ITU-T Study Group, and dated March, 2005, which may be referred to herein as the H.264 standard or H.264 specification, or the H.264/AVC standard or specification.

The Joint Video Team (JVT) continues to work on a scalable video coding (SVC) extension to H.264/MPEG-4 AVC. The specification of the evolving SVC extension is in the form of a Joint Draft (JD). The Joint Scalable Video Model (JSVM) created by the JVT implements tools for use in scalable video, which may be used within system 10 for various coding tasks described in this disclosure. Detailed information concerning Fine Granularity SNR Scalability (FGS) coding can be found in the Joint Draft documents, and particularly in Joint Draft 6 (SVC JD6), Thomas Wiegand, Gary Sullivan, Julien Reichel, Heiko Schwarz, and Mathias Wien, "Joint Draft 6: Scalable Video Coding," JVT-S 201, April 2006, Geneva, and in Joint Draft 9 (SVC JD9), Thomas Wiegand, Gary Sullivan, Julien Reichel, Heiko Schwarz, and Mathias Wien, "Joint Draft 9 of SVC Amendment," JVT-V 201, January 2007, Marrakech, Morocco. Also, additional details of one implementation of the techniques described herein may be found in proposal document JVT-V092 submitted to the JVT of ISO/IEC MPEG and ITU-T VCEG by Marta Karczewicz, Hyukjune Chung and Phoom Sagetong on Jan. 13-19, 2007 at the 22nd Meeting in Marrakech, Morocco.

In some aspects, for video broadcasting, the techniques described in this disclosure may be applied to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). That is to say, communication channel 15 may comprise a wireless information channel used to broadcast wireless video information according to the FLO Specification, or the like. The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast—terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple receive devices, each of which may be similar to receive device 16 of FIG. 1. As an example, receive device 16 may comprise a wireless communication device, such as a mobile handset commonly referred to as a cellular radiotelephone.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like. In addition, source device 12 and receive device 16 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being modulator/transmitter 24 of source device 12 and receiver/demodulator 26 of receive device 16 in FIG. 1.

A video sequence includes a series of video frames. Video encoder 22 operates on blocks of pixels within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16 by 16, 8 by 8, 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components.

Smaller video blocks can provide better resolution, and may be used for locations of a video frame that include higher levels of detail. In general, macroblocks (MBs) and the various sub-blocks may be considered to be video blocks. In addition, a slice may be considered to be a series of video blocks, such as MBs and/or sub-blocks. Each slice may be an independently decodable unit. After prediction, a transform may be performed on the 8×8 residual block or 4×4 residual block, and an additional transform may be applied to the DC coefficients of the 4×4 blocks for chroma components or luma component if the intra__16×16 prediction mode is used.

Following intra- or inter-based predictive coding, additional coding techniques may be applied to the transmitted bitstream. These additional coding techniques may include transformation techniques (such as the 4×4 or 8×8 integer transform used in H.264/AVC or a discrete cosine transformation DCT), and variable length coding. In particular, the disclosure provides techniques for coding CBPs of video blocks, which may be performed at encoder 22 to encode the data, and at decoder 26 to decode the data. Again, CBPs refer to patterns of coefficients within video blocks, e.g., patterns of discrete cosine transformed coefficients or integer transform coefficients. In order to code different CBPs, VLC techniques can be used, in which patterns of coefficients that are more likely to occur are coded with shorter codes, and patterns of coefficients that are less likely to occur are coded with longer codes. The coded video block may include a flag or other information within its header to indicate that CBPs are being used in the coding scheme.

According to the techniques of this disclosure, several different VLC tables are stored in source device 12 and receive device 16. During the encoding and decoding processes, VLC tables are selected to perform the coding of CBPs for a given video block. The table may be selected in a manner that promotes coding efficiency by exploiting the phenomenon of spatial redundancy within a video frame. Specifically, according to the techniques of this disclosure, video encoder 22 and video decoder 28 may perform table selection for CBP VLC of a current video block based on a number of neighboring video blocks to the current video block that include non-zero transform coefficients (e.g., non-zero DCT coefficients). The neighboring blocks may comprise blocks that were previously coded, and the number of neighboring blocks that include non-zero transform coefficients may provide a good table selection metric for CBP coding of a current video block due to likelihood of the spatial similarities between the current video block and its neighbors.

In one example, encoder 22 and decoder 28 may perform reciprocal methods that each calculate a table index value for a current video block based on a number of neighboring video blocks to the current video block that include non-zero transform coefficients, and select a VLC table from a plurality of tables based on the table index. Video encoder 22 encodes CBPs of the current video block using the selected VLC table, while video decoder 28 decodes the CBPs of the current video block using the selected VLC table. Since encoder 22 and decoder 28 base the table selection on the same criteria, the same table selected for a given video block in the encoding process should be identified and selected in the decoding process, ensuring that the coding processes applied by the encoder and decoder remain in synchronization.

Figure 2:
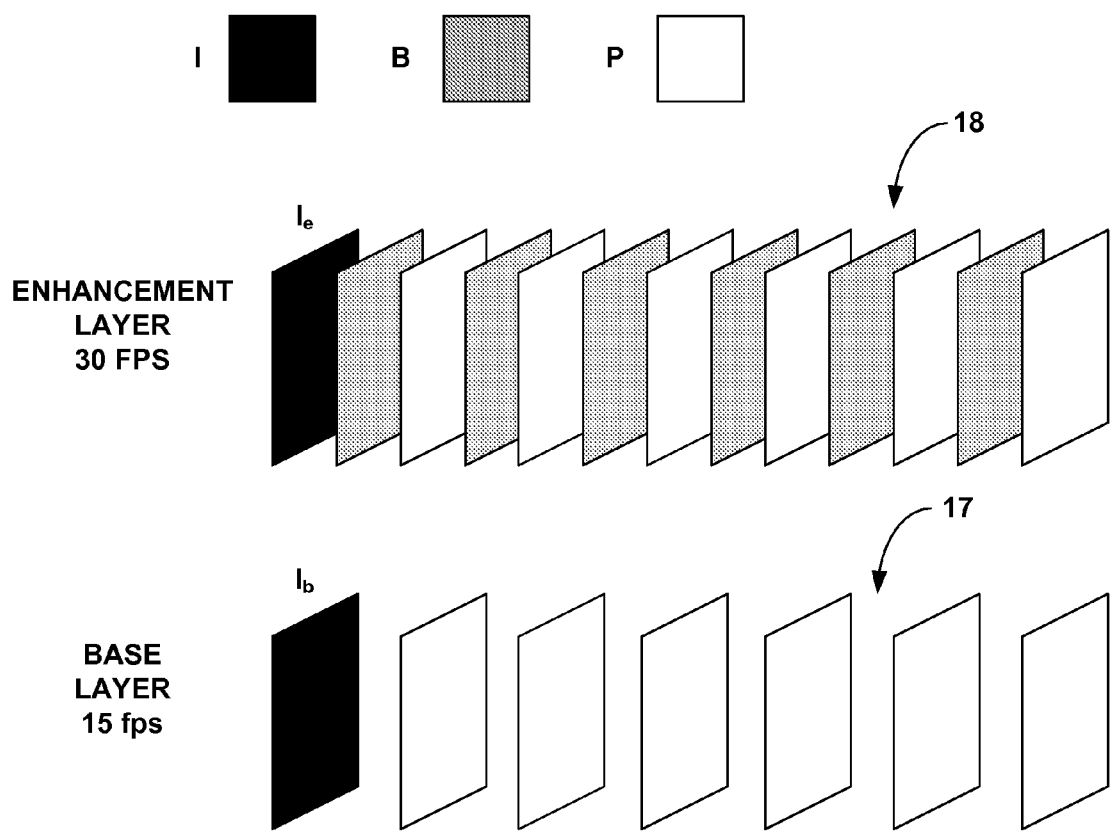
FIG. 2 is a conceptual diagram illustrating video frames of a base layer and an enhancement layer of a scalable video bitstream.

FIG. 2 is a diagram illustrating video frames within a base layer 17 and enhancement layer 18 of a scalable video bitstream. As noted above, the techniques of this disclosure may be particularly useful in the coding of video blocks of enhancement layers. Base layer 17 may comprise a bitstream containing encoded video data that represents the first level of spatial, temporal, or SNR scalability. Enhancement layer 18 may comprise a bitstream containing encoded video data that represents a second level of spatial-temporal-SNR scalability. In some cases, the enhancement layer bitstream is only decodable in conjunction with the base layer, and is not independently decodable. Enhancement layer 18 contains references to the decoded video data in base layer 17. Such references may be used either in the transform domain or pixel domain to generate the final decoded video data.

Base layer 17 and enhancement layer 18 may contain intra (I), inter (P), and bi-directional (B) frames. The P frames in enhancement layer 18 rely on references to P frames in base layer 17. By decoding frames in enhancement layer 18 and base layer 17, a video decoder is able to increase the video quality of the decoded video. For example, base layer 17 may include video encoded at a minimum frame rate of 15 frames per second, whereas enhancement layer 18 may include video encoded at a higher frame rate of 30 frames per second. To support encoding at different quality levels, base layer 17 and enhancement layer 18 may be encoded with a higher quantization parameter (QP) and lower QP, respectively. Moreover, base layer 17 may be transmitted in a manner that is more reliable than the transmission of enhancement layer 18. As an example, the most reliable portions of a modulated signal may be used to transmit base layer 17, while less reliable portions of the modulated signal may be used to transmit enhancement layer 18. The illustration of FIG. 2 is merely exemplary, as base and enhancement layers could be defined in many different ways.

Figure 3:
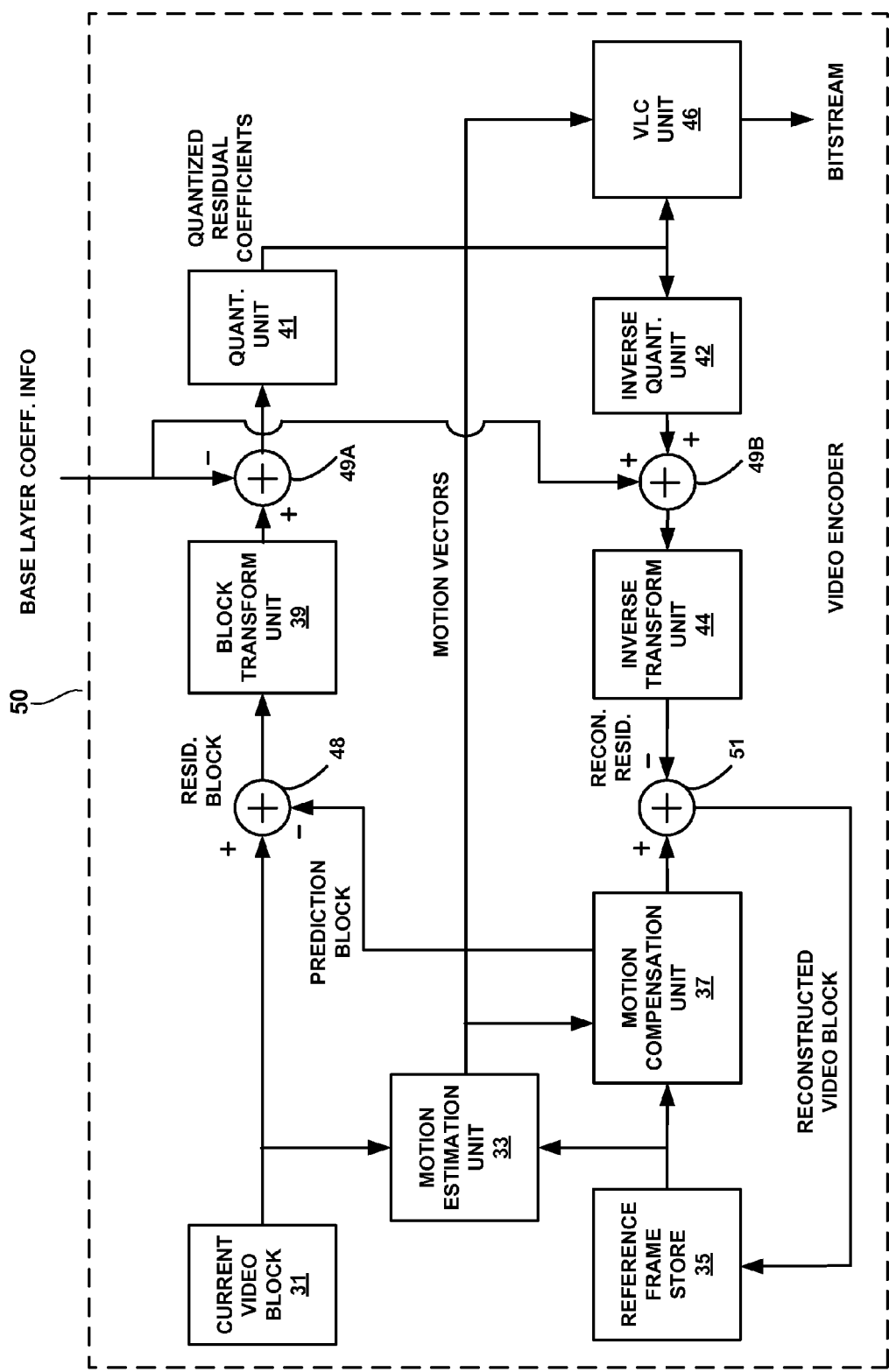
FIG. 3 is a block diagram illustrating an example of a video encoder consistent with this disclosure.

FIG. 3 is a block diagram illustrating an example of a video encoder 50 that includes a VLC unit 46 to encode data consistent with this disclosure. Video encoder 50 of FIG. 3 may correspond to enhancement layer encoder 34 of source device 12 in FIG. 1. That is to say, base layer encoding components are not illustrated in FIG. 3 for simplicity. Therefore, video encoder 50 may be considered an enhancement layer encoder. In some cases, the illustrated components of video encoder 50 could also be implemented in combination with base layer encoding modules or units, e.g., in a pyramid encoder design that supports scalable video coding of the base layer and the enhancement layer.

Video encoder 50 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 50 performs motion estimation to track the movement of matching video blocks between two or more adjacent frames. For intra-coding, spatial prediction is used to identify other blocks within a frame that closely match the block being coded. Intra-coding, spatial prediction components, are not illustrated in FIG. 3.

As shown in FIG. 3, video encoder 50 receives a current video block 31 (e.g., an enhancement layer video block) within a video frame to be encoded. In the example of FIG. 3, video encoder 50 includes motion estimation unit 33, reference frame store 35, motion compensation unit 37, block transform unit 39, quantization unit 41, inverse quantization unit 42, inverse transform unit 44 and VLC unit 46. A deblocking filter (not shown) may also be included to filter block boundaries to remove blockiness artifacts. Video encoder 50 also includes summer 48 and summer 51. FIG. 3 illustrates the temporal prediction components of video encoder 50 for inter-coding of video blocks. Although not shown in FIG. 3 for ease of illustration, video encoder 50 also may include spatial prediction components for intra-coding of some video blocks. Spatial prediction components, however, are usually used only for base layer coding.

Motion estimation unit 33 compares video block 31 to blocks in one or more adjacent video frames to generate one or more motion vectors. The adjacent frame or frames may be retrieved from reference frame store 35, which may comprise any type of memory or data storage device to store video blocks reconstructed from previously encoded blocks. Motion estimation may be performed for blocks of variable sizes, e.g., 16×16, 16×8, 8×16, 8×8 or smaller block sizes. Motion estimation unit 33 identifies a block in an adjacent frame that most closely matches the current video block 31, e.g., based on a rate distortion model, and determines a displacement between the blocks. On this basis, motion estimation unit 33 produces a motion vector (MV) (or multiple MV's in the case of bidirectional prediction) that indicates the magnitude and trajectory of the displacement between current video block 31 and a predictive block used to code current video block 31.

Motion vectors may have half- or quarter-pixel precision, or even finer precision, allowing video encoder 50 to track motion with higher precision than integer pixel locations and obtain a better prediction block. When motion vectors with fractional pixel values are used, interpolation operations are carried out in motion compensation unit 37. Motion estimation unit 33 may identify the best motion vector for a video block using a rate-distortion model. Using the resulting motion vector, motion compensation unit 37 forms a prediction video block by motion compensation.

Video encoder 50 forms a residual video block by subtracting the prediction video block produced by motion compensation unit 37 from the original, current video block 31 at summer 48. Block transform unit 39 applies a transform, such as a discrete cosine transform (DCT), to the residual block, producing residual transform block coefficients. Quantization unit 41 quantizes the residual transform block coefficients to further reduce bit rate. Summer 49A receives base layer coefficient information, e.g., from a base layer encoder (not show) and is positioned between block transform unit 39 and quantization unit 41 to supply this base layer coefficient information into the enhancement layer coding. In particular, summer 49A subtracts the base layer coefficient information from the output of block transform unit 39. In a similar fashion, summer 49B, which is positioned between inverse transform unit 44 and inverse quantization unit 42, also receives the base layer coefficient information from the base layer encoder (not shown). Summer 49B adds the base layer coefficient information back to the output of inverse quantization unit 42.

Spatial prediction coding operates very similar to temporal prediction coding. However, whereas temporal prediction coding relies on blocks of adjacent frames (or other coded units) to perform the coding, spatial prediction relies on blocks of within a common frame (other coded unit) to perform the coding. Spatial prediction coding codes intra blocks, while temporal prediction coding codes inter blocks. Again, the spatial prediction components are not shown in FIG. 3 for simplicity.

VLC coding unit 46 codes the quantized transform coefficients according a variable length coding methodology to even further reduce the bit rate of transmitted information. In particular, VLC coding unit 46 applies techniques of this disclosure to code CBPs. To do so, VLC coding unit 46 calculates a table index value for a current video block based on a number of neighboring video blocks to the current video block that include non-zero transform coefficients, and selects a VLC table from a plurality of tables based on the table index. VLC coding unit 46 then encodes CBPs of the current video block using the selected VLC table. The selected VLC table may promote coding efficiency for the CBPs of the current video block. The use of neighboring video blocks (specifically those that include non-zero transform coefficients) to facilitate the table selection provides a convenient mechanism for making the table selection due to the high probability of spatial similarities between neighbors. The neighboring video blocks, for example, may be blocks that were previously coded prior to the coding of the current video block.

Following the variable length coding, the encoded video may be transmitted to another device. In addition, inverse quantization unit 42 and inverse transform unit 44 apply inverse quantization and inverse transformation, respectively, to reconstruct the residual block. Summer 51 adds the reconstructed residual block to the motion compensated prediction block produced by motion compensation unit 37 to produce a reconstructed video block for storage in reference frame store 35. The reconstructed video block is used by motion estimation unit 33 and motion compensation unit 37 to encode a block in a subsequent video frame.

Figure 4:
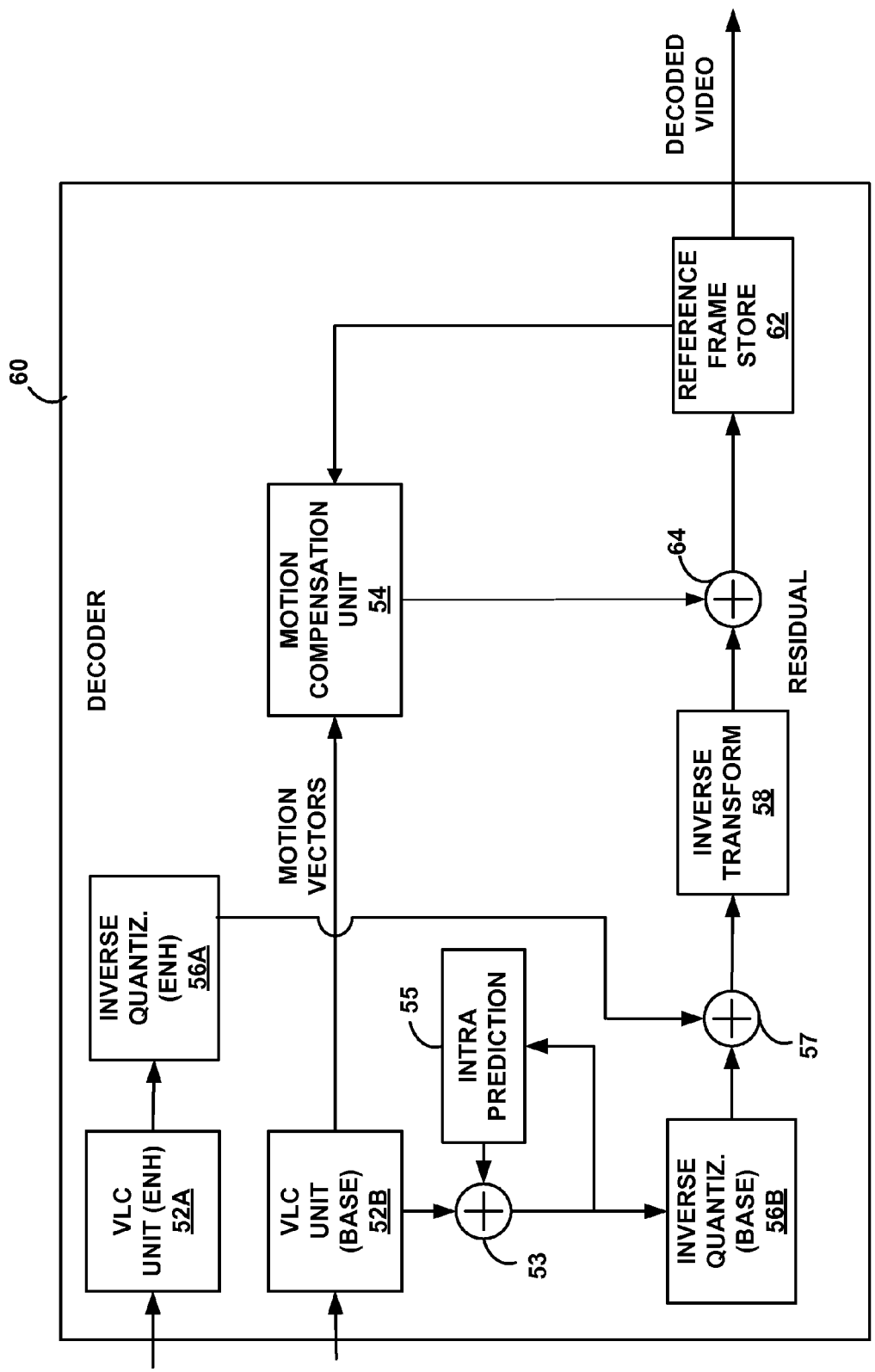
FIG. 4 is a block diagram illustrating an example of a video decoder consistent with this disclosure.

FIG. 4 is a block diagram illustrating an example of a video decoder 60, which may correspond to video decoder 28 of FIG. 1, or a decoder of another device. Video decoder 60 includes a VLC decoding unit 52A that performs the reciprocal function of VLC encoding unit 46 of FIG. 3 for enhancement layer video blocks. That is to say, like VLC encoding unit 46, VLC decoding unit 52A calculates a table index value for a current video block based on a number of neighboring video blocks to the current video block that include non-zero transform coefficients, and selects a VLC table from a plurality of tables based on the table index. VLC decoding unit 52A then decodes CBPs of the current video block using the selected VLC table, which should be the same as the table selected by VLC encoding unit 46 during the encoding process.

Video decoder 60 may also include another VLC unit 52B for base layer information. Intra prediction unit 55 may optionally perform any spatial decoding of base layer video blocks, and the output of intra prediction unit 55 may be provided to adder 53. The enhancement layer path may include inverse quantization unit 56A, and the base layer path may include inverse quantization unit 56B. The information in the base layer and enhancement layer paths may be combined by adder 57.

Video decoder 60 may perform intra- and inter-decoding of blocks within video frames. In the example of FIG. 4, video decoder 60 includes VLC units 52A and 52B (mentioned above), motion compensation unit 54, inverse quantization units 56A and 56B, inverse transform unit 58, and reference frame store 62. Video decoder 60 also includes summer 64. Optionally, video decoder 60 also may include a deblocking filter (not shown) that filters the output of summer 64. Again, summer 57 combines information in the base layer and enhancement layer paths, and intra prediction unit 55 and adder 53 facilitate any spatial decoding of base layer video blocks.

Again, for enhancement layer video blocks, VLC decoding unit 52A receives the encoded video bitstream and applies a VLC technique on CBPs as described in this disclosure. This may produce quantized residual coefficients, macroblock and sub-block coding mode and motion information, which may include motion vectors and block partitions. In particular, VLC decoding unit 52A uses an adaptive VLC table selection technique, which is based on the number of neighboring video blocks that have non-zero transform coefficients. In this manner, the phenomenon of spatial redundancy can be used to select tables for VLC of CBPs.

Following the decoding performed by VLC unit 52A, motion compensation unit 54 receives the motion vectors and one or more reconstructed reference frames from reference frame store 62. Inverse quantization unit 56A inverse quantizes, i.e., de-quantizes, the quantized block coefficients. Following combination of the enhancement and base layer information by adder 57, inverse transform unit 58 applies an inverse transform, e.g., an inverse DCT, to the coefficients to produce residual blocks. Motion compensation unit 54 produces motion compensated blocks that are summed by summer 64 with the residual blocks to form decoded blocks. If desired, a deblocking filter may also be applied to filter the decoded blocks in order to remove blockiness artifacts. The filtered blocks are then placed in reference frame store 62, which provides reference blocks from motion compensation and also produces decoded video to a drive display device (such as device 30 of FIG. 1).

Figure 5:
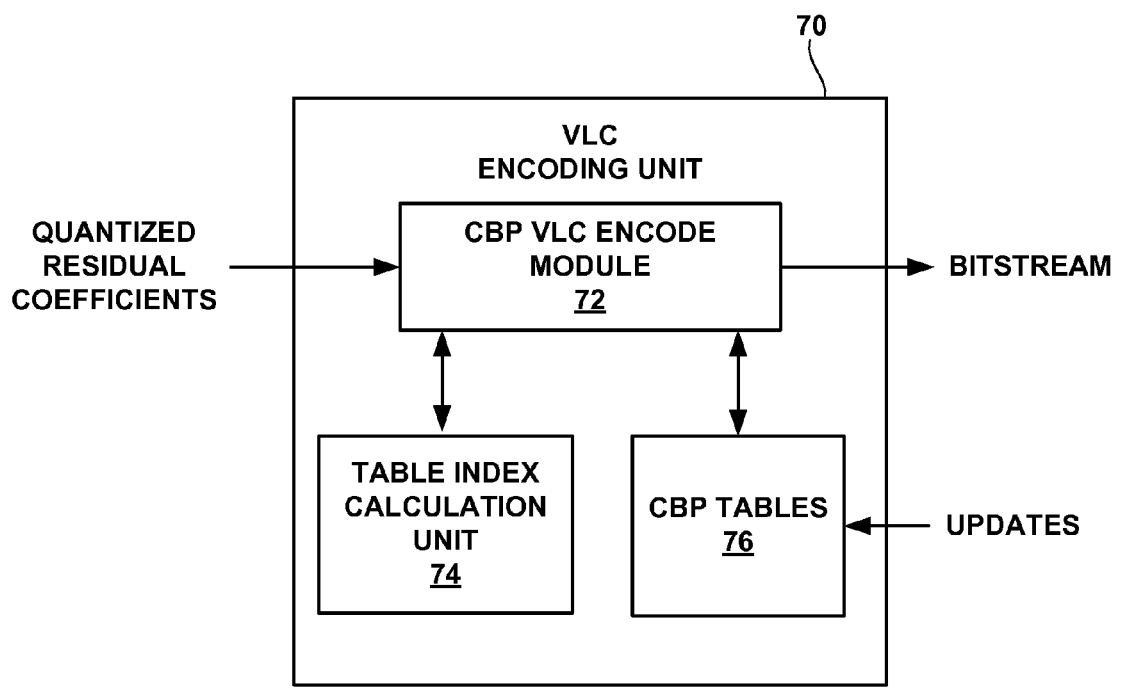
FIG. 5 is an exemplary block diagram of a variable length coding (VLC) encoding unit.

FIG. 5 is a block diagram illustrating an exemplary VLC encoding unit 70, which may correspond to VLC encoding unit 46 of FIG. 3. VLC encoding unit 70 includes a CBP VLC encode module 72 and a table index calculation unit 74. CBP tables 76 generally refer to tables that may be stored in any location, e.g., locally or off-chip in a separate memory location. CBP tables 76 may be updated, periodically, as desired.

CBPs refer to patterns of coefficients within video blocks that are coded according to a scheme. Some patterns may be much more likely to occur in video blocks than other patterns. Based on this factor, VLC may be used to compress data by recognizing patterns of coefficients and coding such patterns as CBPs. Information in the block header can identify the fact that CBPs are used in the coding scheme.

The phenomenon of spatial redundancy generally predicts that video block in close spatial proximity will have a high level of correlation. Based on this phenomenon, this disclosure proposes the use of adjacent video blocks to facilitate table selections for efficient VLC of CBPs. This can improve the efficiency of the VLC of CBPs relative to conventional techniques that use a fixed mapping for all CBPs or use tables based on the type of block (e.g., intra block versus inter block).

In VLC encoding unit 70, a plurality of CBP tables 76 are stored. These tables, however, could alternatively be stored in a separate (e.g., off-chip) location. Table calculation unit 74 calculates a table index value for a current video block based on a number of neighboring video blocks to the current video block that include non-zero transform coefficients. CBP VLC encode module 72 then selects a VLC table from the plurality of tables 76 based on the table index. Upon selecting the proper table, CBP VLC encode module 72 encodes CBPs of the current video block using the selected VLC table.

As an example, the current video block may comprise a 16 by 16 macroblock, and the neighboring video blocks comprise 8 by 8 luma blocks associated with first neighboring macroblock left of the current video block and a second neighboring macroblock above the current video block. Chroma blocks (e.g., sub-sampled 8 by 8 chroma blocks associated with 16 by 16 macroblocks) may also be used as neighboring blocks in the calculations described herein, although the use of neighboring luma blocks only, for purposes of table selection, may be sufficient. The block sizes and locations of the neighboring blocks described herein are merely exemplary, as the techniques of this disclosure may be implemented with any of a wide variety of video block sizes and coding formats.

As a further example, table index calculation unit 74 may calculate the table index as:

$N=(N(1)+N(u))/2+1$ when information of non-zero transform coefficients exists for both the first neighboring macroblock and the second neighboring macroblock;

$N=N(1)+1$ when information of non-zero transform coefficients exists for the first neighboring macroblock but not for the second neighboring macroblock; and $N=N(u)+1$ when information of non-zero transform coefficients exists for the second neighboring macroblock but not for the first neighboring macroblock. In this example, N represents the table index, N(1) represents a number of neighboring luma blocks left of the current video block that include non-zero transform coefficients and N(u) represents a number of neighboring luma blocks above the current video block that include non-zero transform coefficients.

The plurality of CBP tables may tables formed from the following:

TABLE 1

| Code Number | Table Index 0 | Table Index 1 | Table Index 2 | Table Index 3 | Table Index 4 | Table Index 5 |
|---|---|---|---|---|---|---|
| 0 | 0 | 0 | 0 | 0 | 15 | 47 |
| 1 | 15 | 8 | 1 | 15 | 47 | 15 |
| 2 | 47 | 4 | 4 | 1 | 0 | 31 |
| 3 | 31 | 2 | 2 | 4 | 31 | 7 |
| 4 | 16 | 1 | 8 | 5 | 11 | 11 |
| 5 | 12 | 47 | 10 | 10 | 7 | 13 |
| 6 | 4 | 31 | 12 | 2 | 3 | 14 |
| 7 | 1 | 10 | 15 | 12 | 5 | 0 |
| 8 | 8 | 15 | 5 | 3 | 14 | 5 |
| 9 | 13 | 12 | 3 | 47 | 1 | 3 |
| 10 | 5 | 16 | 14 | 31 | 13 | 10 |
| 11 | 11 | 5 | 11 | 8 | 10 | 1 |
| 12 | 3 | 3 | 13 | 11 | 12 | 12 |
| 13 | 2 | 32 | 7 | 7 | 2 | 23 |
| 14 | 10 | 14 | 16 | 13 | 4 | 39 |
| 15 | 7 | 11 | 31 | 14 | 8 | 29 |
| 16 | 23 | 7 | 47 | 16 | 6 | 27 |
| 17 | 21 | 13 | 6 | 6 | 9 | 45 |
| 18 | 28 | 9 | 9 | 9 | 29 | 30 |
| 19 | 18 | 6 | 32 | 29 | 27 | 43 |
| 20 | 14 | 27 | 30 | 30 | 23 | 2 |
| 21 | 29 | 30 | 26 | 45 | 30 | 4 |
| 22 | 30 | 23 | 28 | 46 | 43 | 46 |
| 23 | 26 | 21 | 46 | 27 | 16 | 8 |
| 24 | 17 | 29 | 44 | 43 | 45 | 6 |
| 25 | 27 | 46 | 21 | 26 | 39 | 21 |
| 26 | 20 | 28 | 42 | 21 | 46 | 9 |
| 27 | 19 | 26 | 29 | 28 | 21 | 16 |
| 28 | 24 | 39 | 27 | 44 | 37 | 19 |
| 29 | 6 | 45 | 45 | 23 | 19 | 37 |
| 30 | 44 | 24 | 23 | 32 | 26 | 26 |
| 31 | 22 | 19 | 24 | 39 | 35 | 35 |
| 32 | 46 | 42 | 43 | 42 | 28 | 42 |
| 33 | 45 | 17 | 40 | 19 | 42 | 28 |
| 34 | 9 | 43 | 20 | 37 | 44 | 44 |
| 35 | 39 | 20 | 36 | 35 | 20 | 22 |
| 36 | 37 | 40 | 37 | 20 | 17 | 25 |
| 37 | 25 | 37 | 18 | 18 | 25 | 17 |
| 38 | 35 | 18 | 17 | 24 | 22 | 18 |
| 39 | 43 | 44 | 19 | 17 | 18 | 20 |
| 40 | 40 | 25 | 34 | 34 | 32 | 24 |
| 41 | 41 | 36 | 33 | 36 | 24 | 33 |
| 42 | 38 | 22 | 39 | 33 | 33 | 38 |
| 43 | 42 | 34 | 35 | 25 | 41 | 32 |
| 44 | 36 | 35 | 25 | 22 | 38 | 34 |
| 45 | 32 | 33 | 22 | 40 | 36 | 40 |
| 46 | 33 | 41 | 38 | 38 | 34 | 41 |
| 47 | 34 | 38 | 41 | 41 | 40 | 36 |

Each of the plurality of CBP tables 76 may comprise the code number column of TABLE 1 combined with one of the table index columns of TABLE 1. The plurality of tables may be stored individually, in a manner similar TABLE 1, or in another manner. In any case, CBP VLC encode module 72 may encode CBPs by selecting a code number from the code number column for a CBP value listed in a column of TABLE 1 that corresponds to the calculated table index. Updates to CBP tables 76 may occur, as needed or desired, and the values within the tables are subject to a wide variety of variations. TABLE 1, above, is merely exemplary of a plurality of tables that could be used.

Again, the techniques of this disclosure may be particularly useful in coding one or more enhancement layers in the context of scalable video coding (SVC). In this case, CBPs are used in coding the enhancement layers, and table selection for VLC of such CBPs in the enhancement layers is performed according to the techniques described herein. The coding techniques are performed at the encoder and the decoder.

Conventionally, fixed mappings between CBPs and code numbers are used, which can fail to adapt to varying scene characteristics thereby resulting in inefficiencies. The described techniques may also be more efficient than techniques that use different tables for intra- and inter-coded blocks. In most cases, more than two tables are stored, and the table selection is made among the three or more tables. In the example of TABLE 1, five different VLC tables are defined by the code number column and the five different table index columns.

Figure 6:
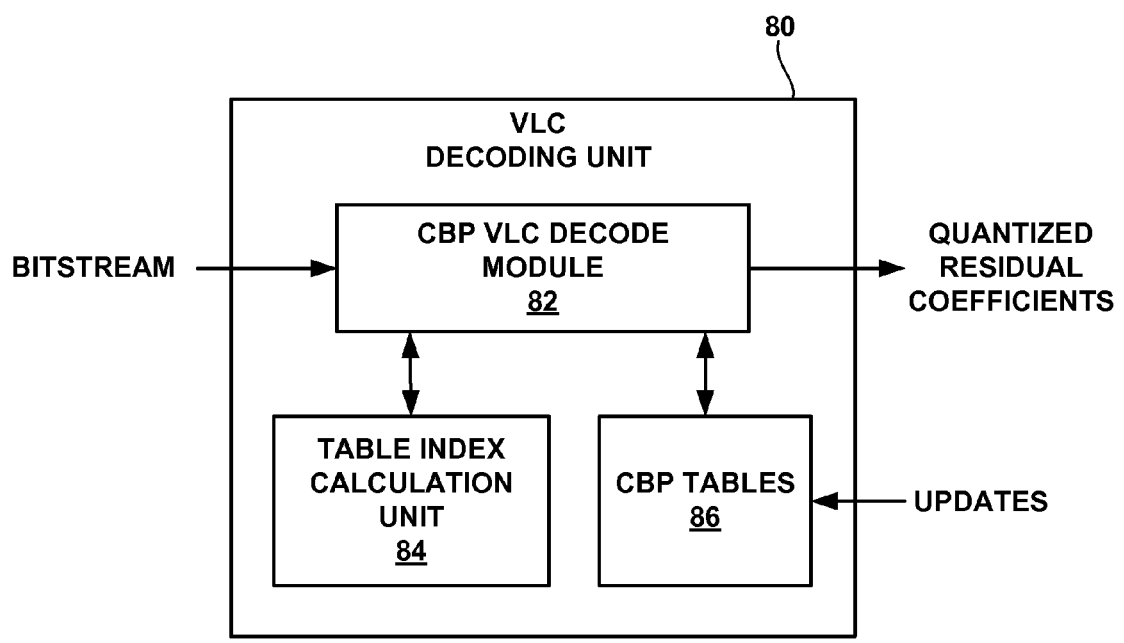
FIG. 6 is an exemplary block diagram of a VLC decoding unit.

FIG. 6 is a block diagram illustrating an exemplary VLC decoding unit 80, which may correspond to VLC encoding unit 52 of FIG. 4. VLC decoding unit 80 is substantially similar to VLC encoding unit 70, but performs reciprocal decoding functions relative to the encoding that is performed by VLC encoding unit 70. Thus, whereas VLC encoding unit 70 receives quantized residual coefficients and generates a bitstream, VLC decoding unit 80 receives a bitstream and generates quantized residual coefficients. VLC decoding unit includes a CBP VLC decode module 82 and a table index calculation unit 84. CBP tables 86 comprise tables that may be stored in any location, e.g., locally or off-chip in a separate memory location. CBP tables 104 may be updated, periodically, as desired.

Like In VLC encoding unit 70, VLC decoding unit 80 has access to a plurality of CBP tables 86. Again, these tables may be stored locally, or could alternatively be stored in a separate (e.g., off-chip) location. Table calculation unit 84 calculates a table index value for a current video block based on a number of neighboring video blocks to the current video block that include non-zero transform coefficients. Since block-based video coding typically occurs sequentially from left-to-right and top-to-bottom, the neighboring video blocks may comprise blocks located to the left and above the current video block. CBP VLC decode module 82 selects a VLC table from the plurality of tables 86 based on the table index. Upon selecting the proper table, CBP VLC decode module 82 decodes CBPs of the current video block using the selected VLC table to generate the proper coefficients.

Like in the encoding process, in the decoding process, the current video block may comprise a 16 by 16 macroblock, and the neighboring video blocks comprise 8 by 8 luma blocks associated with first neighboring macroblock left of the current video block and a second neighboring macroblock above the current video block. Furthermore, chroma blocks (e.g., sub-sampled 8 by 8 chroma blocks associated with 16 by 16 macroblocks) may also be used, although the use of neighboring luma blocks only, for purposes of table selection, may be sufficient. Again, the block sizes listed herein are merely exemplary, as the techniques of this disclosure may be implemented with any of a wide variety of video block sizes or formats.

Table index calculation unit 84 may calculate the table index as:

$N=(N(1)+N(u))/2+1$ when information of non-zero transform coefficients exists for both the first neighboring macroblock and the second neighboring macroblock;

$N=N(1)+1$ when information of non-zero transform coefficients exists for the first neighboring macroblock but not for the second neighboring macroblock; and $N=N(u)+1$ when information of non-zero transform coefficients exists for the second neighboring macroblock but not for the first neighboring macroblock. In this example, N represents the table index, N(1) represents a number of neighboring luma blocks left of the current video block that include non-zero transform coefficients and N(u) represents a number of neighboring luma blocks above the current video block that include non-zero transform coefficients.

Like the encoding example, each of the plurality of CBP tables 86 used for decoding may comprise the code number column of TABLE 1 combined with one of the table index columns of TABLE 1. The plurality of tables may be stored individually, in a manner similar TABLE 1, or in another manner. In any case, CBP VLC decode module 82 may decode CBPs by selecting a code number from the code number column for a CBP value listed in a column of TABLE 1 that corresponds to the calculated table index. Updates to CBP tables 86 may occur, as needed, and the values within the tables are subject to a wide variety of variations. Of course, updates would need to be conveyed to both the encoding device and the decoding device. Again, TABLE 1 is merely exemplary of a plurality of tables that could be used.

Figure 7:
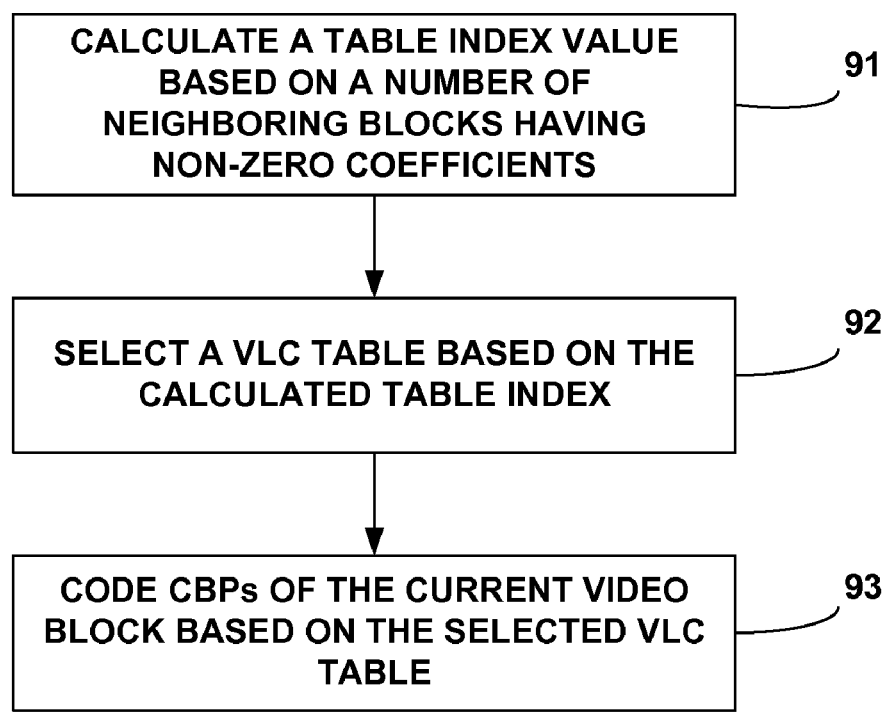
FIG. 7 is a flow diagram illustrating a VLC technique for coding coded block patterns (CBPs) consistent with this disclosure.

FIG. 7 is a flow diagram illustrating a VLC technique for coding CBPs consistent with this disclosure. The technique illustrated in FIG. 7 may be performed by a VLC encoding unit 70 or a VLC decoding unit 80. As shown in FIG. 7, a table index calculation unit 74, 84 calculates a table index value for a current video block based on a number of neighboring blocks to the current video block that have non-zero transform coefficients (91). A CBP VLC coding module 72, 84 selects a VLC table from a plurality or VLC tables 76, 86 based on the calculated table index value (92). The CBP VLC coding module 72, 84 then codes CBPs of the current video block base on the selected VLC table (93). Module 72 performs the encoding and module 82 performs the reciprocal decoding.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

If implemented in hardware, this disclosure may be directed to a circuit, such as an integrated circuit, chipset application specific integrated circuit (ASIC), field programmable gate array (FPGA), logic, or various combinations thereof configured to perform one or more of the techniques described herein.

Various embodiments of the invention have been described. These and other embodiments are within the scope of the following claims.

The invention claimed is:

1. A method comprising:
selecting a variable length coding (VLC) table for a current video block from a plurality of tables based on a number of neighboring video blocks to the current video block that include non-zero transform coefficients,
wherein selecting the VLC table comprises:
calculating a table index value for the current video block based on the number of neighboring video blocks to the current video block that include non-zero transform coefficients; and
selecting the VLC table based on the table index value,
wherein the current video block comprises a 16 by 16 macroblock, and the neighboring video blocks comprise 8 by 8 luma blocks associated with a first neighboring macroblock left of the current video block and a second neighboring macroblock above the current video block,
wherein the table index value is calculated as:
N=(N(1)+N(u))/2+1 when information of non-zero transform coefficients exists for both the first neighboring macroblock and the second neighboring macroblock;
N=N(1)+1 when information of non-zero transform coefficients exists for the first neighboring macroblock but not for the second neighboring macroblock; and
N=N(u)+1 when information of non-zero transform coefficients exists for the second neighboring macroblock but not for the first neighboring macroblock,
wherein N represents the table index value, N(1) represents a number of neighboring luma blocks left of the current video block that include non-zero transform coefficients and N(u) represents a number of neighboring luma blocks above the current video block that include non-zero transform coefficients; and
coding one or more coded block patterns (CBPs) of the current video block using the selected VLC table.

2. The method of claim 1, wherein coding one or more CBPs comprises encoding the CBPs.

3. The method of claim 1, wherein coding one or more CBPs comprises decoding the CBPs.

4. The method of claim 1, wherein the plurality of tables comprises tables formed from the following TABLE 1:

| Code Number | Table Index 0 | Table Index 1 | Table Index 2 | Table Index 3 | Table Index 4 | Table Index 5 |
|---|---|---|---|---|---|---|
| 0 | 0 | 0 | 0 | 0 | 15 | 47 |
| 1 | 15 | 8 | 1 | 15 | 47 | 15 |
| 2 | 47 | 4 | 4 | 1 | 0 | 31 |
| 3 | 31 | 2 | 2 | 4 | 31 | 7 |
| 4 | 16 | 1 | 8 | 5 | 11 | 11 |
| 5 | 12 | 47 | 10 | 10 | 7 | 13 |
| 6 | 4 | 31 | 12 | 2 | 3 | 14 |
| 7 | 1 | 10 | 15 | 12 | 5 | 0 |
| 8 | 8 | 15 | 5 | 3 | 14 | 5 |
| 9 | 13 | 12 | 3 | 47 | 1 | 3 |
| 10 | 5 | 16 | 14 | 31 | 13 | 10 |
| 11 | 11 | 5 | 11 | 8 | 10 | 1 |
| 12 | 3 | 3 | 13 | 11 | 12 | 12 |
| 13 | 2 | 32 | 7 | 7 | 2 | 23 |
| 14 | 10 | 14 | 16 | 13 | 4 | 39 |
| 15 | 7 | 11 | 31 | 14 | 8 | 29 |
| 16 | 23 | 7 | 47 | 16 | 6 | 27 |
| 17 | 21 | 13 | 6 | 6 | 9 | 45 |
| 18 | 28 | 9 | 9 | 9 | 29 | 30 |
| 19 | 18 | 6 | 32 | 29 | 27 | 43 |
| 20 | 14 | 27 | 30 | 30 | 23 | 2 |
| 21 | 29 | 30 | 26 | 45 | 30 | 4 |
| 22 | 30 | 23 | 28 | 46 | 43 | 46 |
| 23 | 26 | 21 | 46 | 27 | 16 | 8 |
| 24 | 17 | 29 | 44 | 43 | 45 | 6 |
| 25 | 27 | 46 | 21 | 26 | 39 | 21 |
| 26 | 20 | 28 | 42 | 21 | 46 | 9 |
| 27 | 19 | 26 | 29 | 28 | 21 | 16 |
| 28 | 24 | 39 | 27 | 44 | 37 | 19 |
| 29 | 6 | 45 | 45 | 23 | 19 | 37 |
| 30 | 44 | 24 | 23 | 32 | 26 | 26 |
| 31 | 22 | 19 | 24 | 39 | 35 | 35 |
| 32 | 46 | 42 | 43 | 42 | 28 | 42 |
| 33 | 45 | 17 | 40 | 19 | 42 | 28 |
| 34 | 9 | 43 | 20 | 37 | 44 | 44 |
| 35 | 39 | 20 | 36 | 35 | 20 | 22 |
| 36 | 37 | 40 | 37 | 20 | 17 | 25 |
| 37 | 25 | 37 | 18 | 18 | 25 | 17 |
| 38 | 35 | 18 | 17 | 24 | 22 | 18 |
| 39 | 43 | 44 | 19 | 17 | 18 | 20 |
| 40 | 40 | 25 | 34 | 34 | 32 | 24 |
| 41 | 41 | 36 | 33 | 36 | 24 | 33 |
| 42 | 38 | 22 | 39 | 33 | 33 | 38 |
| 43 | 42 | 34 | 35 | 25 | 41 | 32 |
| 44 | 36 | 35 | 25 | 22 | 38 | 34 |
| 45 | 32 | 33 | 22 | 40 | 36 | 40 |
| 46 | 33 | 41 | 38 | 38 | 34 | 41 |
| 47 | 34 | 38 | 41 | 41 | 40 | 36 | wherein each of the plurality of tables comprise the code number column of Table 1 combined with one of the table index columns of Table 1, and coding the coded block patterns comprises selecting a code number from the code number column for a CBP value listed in a column of Table 1 that corresponds to the calculated table index.

5. The method of claim 1, wherein the neighboring video blocks comprise the 8 by 8 luma blocks and one or more 8 by 8 chroma blocks associated with the first neighboring macroblock left of the current video block and the second neighboring macroblock above the current video block.

6. The method of claim 1, wherein the method is performed in a wireless communication device (WCD).

7. The method of claim 1, wherein the method is performed with respect to video blocks of an enhancement layer in scalable video coding (SVC).

8. A device comprising a variable length coding (VLC) unit configured to:
select a VLC table for a current video block from a plurality of tables based on a number of neighboring video blocks to the current video block that include non-zero transform coefficients, wherein selecting the variable length coding table comprises:
calculating a table index value for the current video block based on the number of neighboring video blocks to the current video block that include non-zero transform coefficients; and
selecting the VLC table based on the table index value,
wherein the current video block comprises a 16 by 16 macroblock, and the neighboring video blocks comprise 8 by 8 luma blocks associated with a first neighboring macroblock left of the current video block and a second neighboring macroblock above the current video block, wherein the table index value is calculated as:

N=(N(1)+N(u))/2+1 when information of non-zero transform coefficients exists for both the first neighboring macroblock and the second neighboring macroblock;

N=N(1)+1 when information of non-zero transform coefficients exists for the first neighboring macroblock but not for the second neighboring macroblock; and N=N(u)+1 when information of non-zero transform coefficients exists for the second neighboring macroblock but not for the first neighboring macroblock, wherein N represents the table index value, N(1) represents a number of neighboring luma blocks left of the current video block that include non-zero transform coefficients and N(u) represents a number of neighboring luma blocks above the current video block that include non-zero transform coefficients; and code one or more coded block patterns (CBPs) of the current video block using the selected VLC table.

9. The device of claim 8, wherein the VLC unit encodes the one or more CBPs.

10. The device of claim 8, wherein the VLC unit decodes the one or more CBPs.

11. The device of claim 8, wherein the plurality of tables comprises tables formed from the following TABLE 1:

| Code Number | Table Index 0 | Table Index 1 | Table Index 2 | Table Index 3 | Table Index 4 | Table Index 5 |
|---|---|---|---|---|---|---|
| 0 | 0 | 0 | 0 | 0 | 15 | 47 |
| 1 | 15 | 8 | 1 | 15 | 47 | 15 |
| 2 | 47 | 4 | 4 | 1 | 0 | 31 |
| 3 | 31 | 2 | 2 | 4 | 31 | 7 |
| 4 | 16 | 1 | 8 | 5 | 11 | 11 |
| 5 | 12 | 47 | 10 | 10 | 7 | 13 |
| 6 | 4 | 31 | 12 | 2 | 3 | 14 |
| 7 | 1 | 10 | 15 | 12 | 5 | 0 |
| 8 | 8 | 15 | 5 | 3 | 14 | 5 |
| 9 | 13 | 12 | 3 | 47 | 1 | 3 |
| 10 | 5 | 16 | 14 | 31 | 13 | 10 |
| 11 | 11 | 5 | 11 | 8 | 10 | 1 |
| 12 | 3 | 3 | 13 | 11 | 12 | 12 |
| 13 | 2 | 32 | 7 | 7 | 2 | 23 |
| 14 | 10 | 14 | 16 | 13 | 4 | 39 |
| 15 | 7 | 11 | 31 | 14 | 8 | 29 |
| 16 | 23 | 7 | 47 | 16 | 6 | 27 |
| 17 | 21 | 13 | 6 | 6 | 9 | 45 |
| 18 | 28 | 9 | 9 | 9 | 29 | 30 |
| 19 | 18 | 6 | 32 | 29 | 27 | 43 |
| 20 | 14 | 27 | 30 | 30 | 23 | 2 |
| 21 | 29 | 30 | 26 | 45 | 30 | 4 |
| 22 | 30 | 23 | 28 | 46 | 43 | 46 |
| 23 | 26 | 21 | 46 | 27 | 16 | 8 |
| 24 | 17 | 29 | 44 | 43 | 45 | 6 |
| 25 | 27 | 46 | 21 | 26 | 39 | 21 |
| 26 | 20 | 28 | 42 | 21 | 46 | 9 |
| 27 | 19 | 26 | 29 | 28 | 21 | 16 |
| 28 | 24 | 39 | 27 | 44 | 37 | 19 |
| 29 | 6 | 45 | 45 | 23 | 19 | 37 |
| 30 | 44 | 24 | 23 | 32 | 26 | 26 |
| 31 | 22 | 19 | 24 | 39 | 35 | 35 |
| 32 | 46 | 42 | 43 | 42 | 28 | 42 |
| 33 | 45 | 17 | 40 | 19 | 42 | 28 |
| 34 | 9 | 43 | 20 | 37 | 44 | 44 |
| 35 | 39 | 20 | 36 | 35 | 20 | 22 |
| 36 | 37 | 40 | 37 | 20 | 17 | 25 |
| 37 | 25 | 37 | 18 | 18 | 25 | 17 |
| 38 | 35 | 18 | 17 | 24 | 22 | 18 |
| 39 | 43 | 44 | 19 | 17 | 18 | 20 |
| 40 | 40 | 25 | 34 | 34 | 32 | 24 |
| 41 | 41 | 36 | 33 | 36 | 24 | 33 |
| 42 | 38 | 22 | 39 | 33 | 33 | 38 |
| 43 | 42 | 34 | 35 | 25 | 41 | 32 |
| 44 | 36 | 35 | 25 | 22 | 38 | 34 |
| 45 | 32 | 33 | 22 | 40 | 36 | 40 |
| 46 | 33 | 41 | 38 | 38 | 34 | 41 |
| 47 | 34 | 38 | 41 | 41 | 40 | 36 | wherein each of the plurality of tables comprise the code number column of Table 1 combined with one of the table index columns of Table 1, and coding the coded block patterns comprises selecting a code number from the code number column for a CBP value listed in a column of Table 1 that corresponds to the calculated table index.

12. The device of claim 8, wherein the device comprises memory that stores the plurality of tables and wherein the VLC unit comprises:

a table index calculation unit that calculates the table index value; and a module that selects the VLC table from the plurality of tables based on the table index value, and codes the CBPs of the current video block using the selected VLC table.

13. The device of claim 12, wherein the memory resides within the VLC unit of the device.

14. The device of claim 8, wherein the neighboring video blocks comprise the 8 by 8 luma blocks and one or more 8 by 8 chroma blocks associated with the first neighboring macroblock left of the current video block and the second neighboring macroblock above the current video block.

15. The device of claim 8, wherein the device comprises at least one of:

a circuit; and a wireless communication device.

16. The device of claim 8, wherein the current video block comprises a video block of an enhancement layer in scalable video coding (SVC).

17. A device comprising:

means for selecting a variable length coding (VLC) table for a current video block from a plurality of tables based on a number of neighboring video blocks to the current video block that include non-zero transform coefficients wherein the means for selecting the variable length coding table comprises:

means for calculating a table index value for the current video block based on the number of neighboring video blocks to the current video block that include non-zero transform coefficients; and means for selecting the VLC table based on the table index value, wherein the current video block comprises a 16 by 16 macroblock, and the neighboring video blocks comprise 8 by 8 luma blocks associated with a first neighboring macroblock left of the current video block and a second neighboring macroblock above the current video block, wherein the table index value is calculated as:

N=(N(1)+N(u))/2+1 when information of non-zero transform coefficients exists for both the first neighboring macroblock and the second neighboring macroblock;

N=N(1)+1 when information of non-zero transform coefficients exists for the first neighboring macroblock but not for the second neighboring macroblock; and N=N(u)+1 when information of non-zero transform coefficients exists for the second neighboring macroblock but not for the first neighboring macroblock, wherein N represents the table index value, N(1) represents a number of neighboring luma blocks left of the current video block that include non-zero transform coefficients and N(u) represents a number of neighboring luma blocks above the current video block that include non-zero transform coefficients; and means for coding one or more coded block patterns (CBPs) of the current video block using the selected VLC table.

18. A non-transitory computer-readable medium comprising instructions that upon execution in a video coding device cause the device to:

select a variable length coding (VLC) table for a current video block from a plurality of tables based on a number of neighboring video blocks to the current video block that include non-zero transform coefficients, wherein selecting the variable length coding table comprises:

calculating a table index value for the current video block based on the number of neighboring video blocks to the current video block that include non-zero transform coefficients; and selecting the VLC table based on the table index value, wherein the current video block comprises a 16 by 16 macroblock, and the neighboring video blocks comprise 8 by 8 luma blocks associated with a first neighboring macroblock left of the current video block and a second neighboring macroblock above the current video block, wherein the table index value is calculated as:

N=(N(1)+N(u))/2+1 when information of non-zero transform coefficients exists for both the first neighboring macroblock and the second neighboring macroblock;

N=N(1)+1 when information of non-zero transform coefficients exists for the first neighboring macroblock but not for the second neighboring macroblock; and N=N(u)+1 when information of non-zero transform coefficients exists for the second neighboring macroblock but not for the first neighboring macroblock, wherein N represents the table index value, N(1) represents a number of neighboring luma blocks left of the current video block that include non-zero transform coefficients and N(u) represents a number of neighboring luma blocks above the current video block that include non-zero transform coefficients; and code one or more coded block patterns (CBPs) of the current video block using the selected VLC table.

* * * * *